Dec. 10, 1946.    A. MUELLER    2,412,529
VALVE ACTUATING MECHANISM
Filed May 22, 1943    4 Sheets-Sheet 1

Inventor:
Alfred Mueller
By Joseph O. Page Atty.

Inventor:
Alfred Mueller
By Joseph O. Lange Atty.

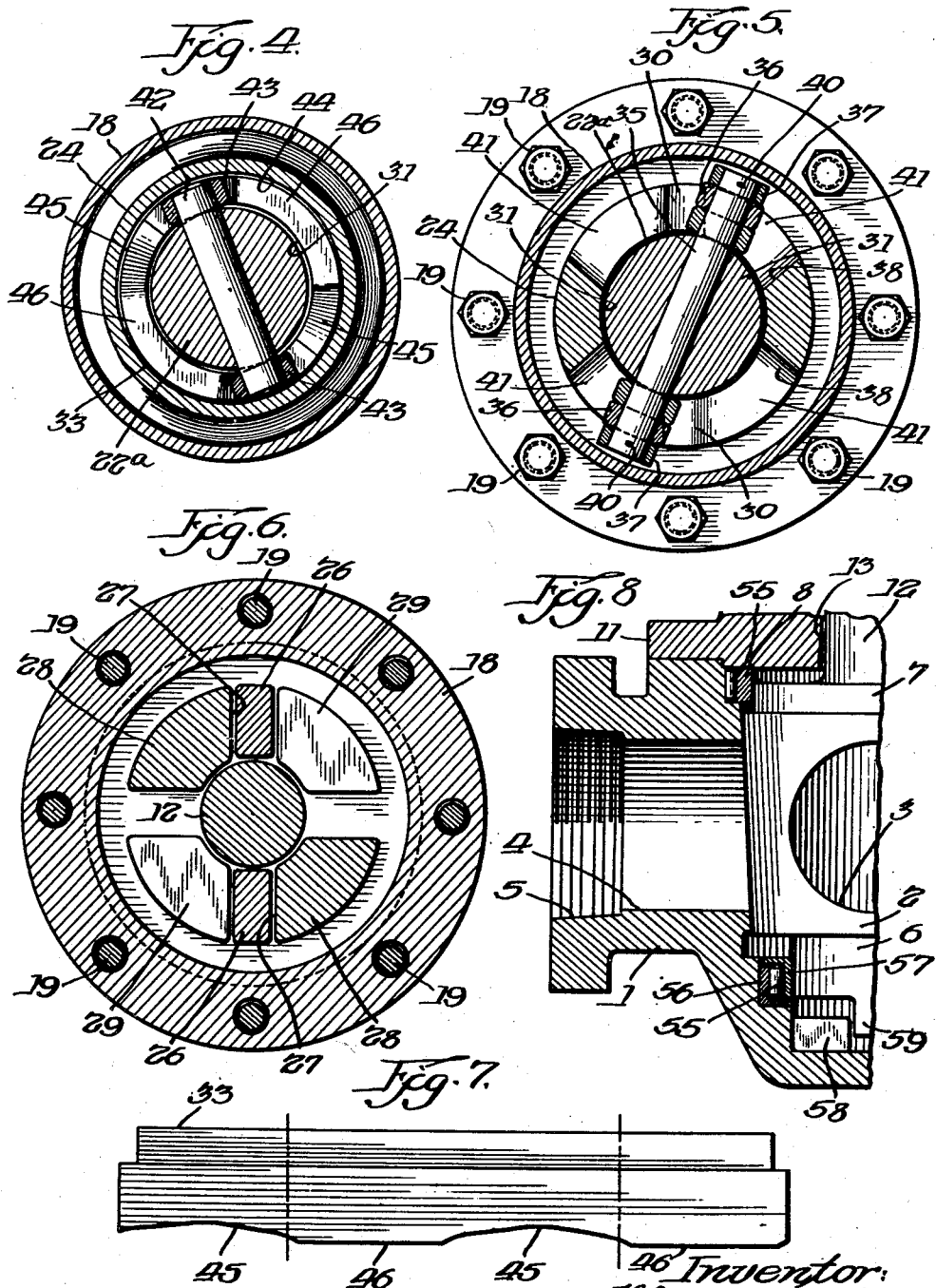

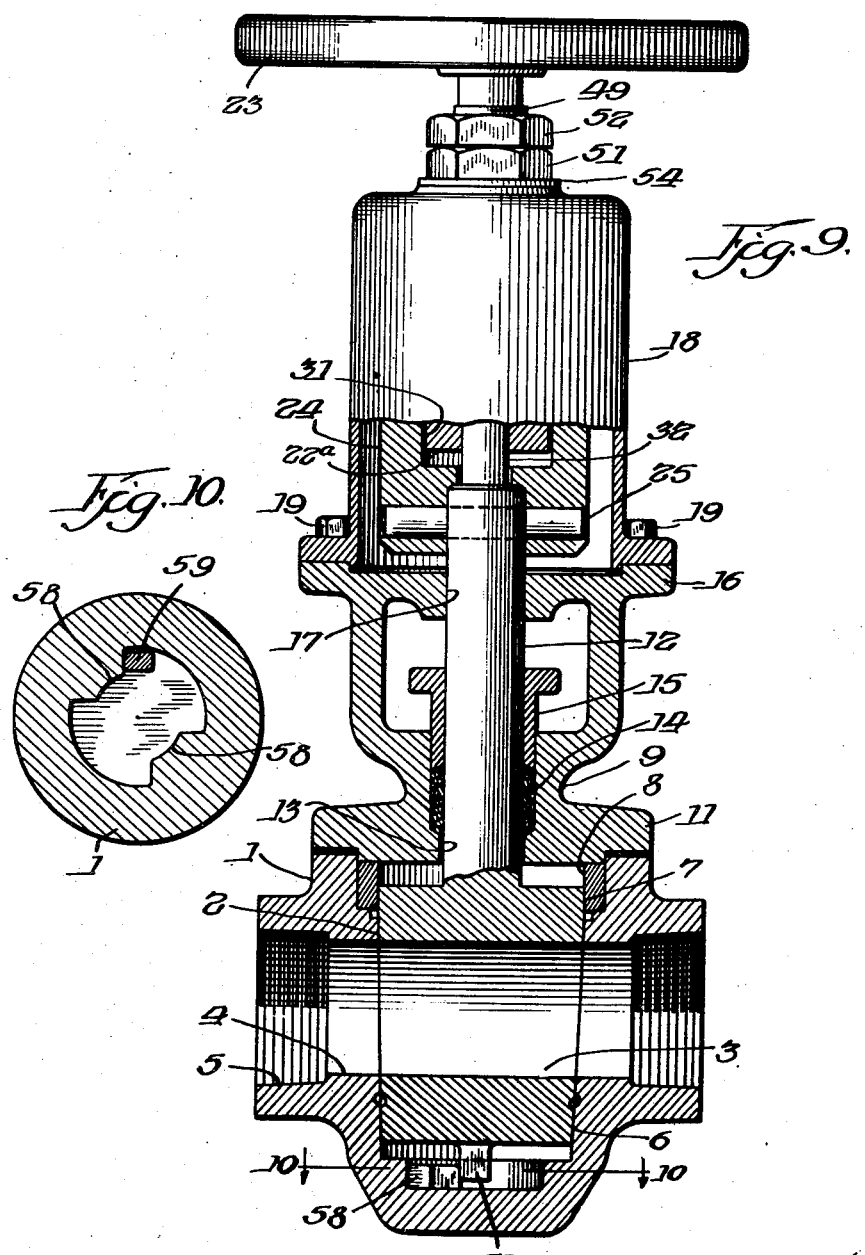

Patented Dec. 10, 1946

2,412,529

UNITED STATES PATENT OFFICE 2,412,529

VALVE ACTUATING MECHANISM

Alfred Mueller, Berwyn, Ill., assignor to Crane Co., Chicago, Ill., a corporation of Illinois Application May 22, 1943, Serial No. 488,313

8 Claims. (Cl. 74—22)

This invention relates broadly to a valve actuating mechanism or the like. More particularly, the invention relates to a combined lifting, rotating and reseating mechanism for use with a rotary plug valve. It will be apparent, however, that the novel actuating means hereinafter described is capable of being applied to devices other than valves in which unseating, rotation and subsequent reseating of a member may be desirable within a casing.

At the outset, it is conceded that the prior art devices cover a wide variety of valve actuating mechanisms for effecting what is termed in the trade an inverted U-type of motion featuring a combined lifting, rotating and reseating mechanism. However, to my knowledge, no one previously has developed a relatively simple and sturdy mechanism in which the valve closure member, generally of frusto-conical form, is positively lifted, then rotated and subsequently reseated. Exhaustive experiments have demonstrated that the instant novel mechanism possesses unusual durability and freedom from the excessive maintenance expense previously encountered in this type of mechanism under the severe service conditions normally met in controlling line fluids at high temperatures and pressures.

It is therefore an important object of this invention to provide a combined rotatable valve closure member and an actuating mechanism therefor which features the employment of annularly arranged cam members preferably in cooperative relationship and with a cam shaft or extension stem interposed therebetween, the cooperation of the cams with the cam shaft providing for successively moving the valve plug or closure member axially in a straight line initially to unseat the same and to reseat it respectively at the beginning and at the end of its rotation from open to closed position and vice versa.

A further important object is to provide a combined valve rotating and lifting mechanism whereby the novel cam members employed produce a relatively compact, easily-contained structure, preferably by having the cams arranged therewithin in telescopic relation to each other and with an interposed cam shaft or extension stem serving as a common journaling medium for rollers or the like to engage the respective cam surfaces of the telescoped cam members.

Another important object lies in providing for a combined valve actuating and lifting mechanism whereby upper and lower cams of substantially cylindrical form cooperate with a vertically extending cam shaft journaled within each cam and with each other to effect the desired reciprocal motion of the valve closure member after suitable rotation thereof in either direction.

A further object of this invention is to provide in combination therewith a novel supplemental bearing positioned between the closure member and the valve body or casing whereby the performance of the actuating mechanism is substantially aided.

Another object is to provide an actuating mechanism in which substantially telescopically positioned cam elements are arranged so that one of the cams cooperates with the valve bonnet or cover to provide means for inhibiting the rotation of the closure member at the limits defining its opened and closed position.

Another important object is to provide a valve actuating mechanism in which the latter may be suitably enclosed and in which such enclosure means also functions as the means for holding one of the cam members constantly against relative rotation with the other cam member.

A further important object is to provide in a valve actuating mechanism a plurality of cam elements cooperating with a substantially vertically extending cam shaft, the latter member having transversely extending axles journaled therewithin and provided with suitable roller means for engaging the respective surfaces of the cams to unseat and to reseat the rotatable closure member after predetermined angular rotation thereof.

A still further object of the invention is to provide in a valve actuating mechanism a pair of substantially telescoping, cylindrical cams in which each of the latter members cooperates with the other to the extent that one of the cams rotates with the said closure member upon predetermined unseating of the said latter member, the other cooperating cam being non-rotatable, but axially movable with the predeterminedly rotatable and axially movable cam member.

Added important objects and advantages will become apparent upon proceeding with the following description of preferred embodiments of the invention in connection with the accompanying drawings, in which Fig. 1 is a vertical sectional assembly view of a valve embodying my invention.

Fig. 4 is a similar sectional view taken on the line 4—4 of Fig. 2.

Fig. 5 is a similar view taken on the line 5—5 of Fig. 2.

Fig. 6 is a similar section on the line 6—6 of Fig. 2.

Fig. 7 shows a surface development of the novel upper cam viewed on its outer diameter.

Fig. 8 is a fragmentary sectional view of a modified form of guide bearing employed between the valve closure member and the valve casing or body.

Fig. 9 is a vertical fragmentary sectional assembly view of a modified form of rotation inhibiting means for the closure member.

Fig. 10 is a sectional view taken on the line 10—10 of Fig. 9.

Figure 1:
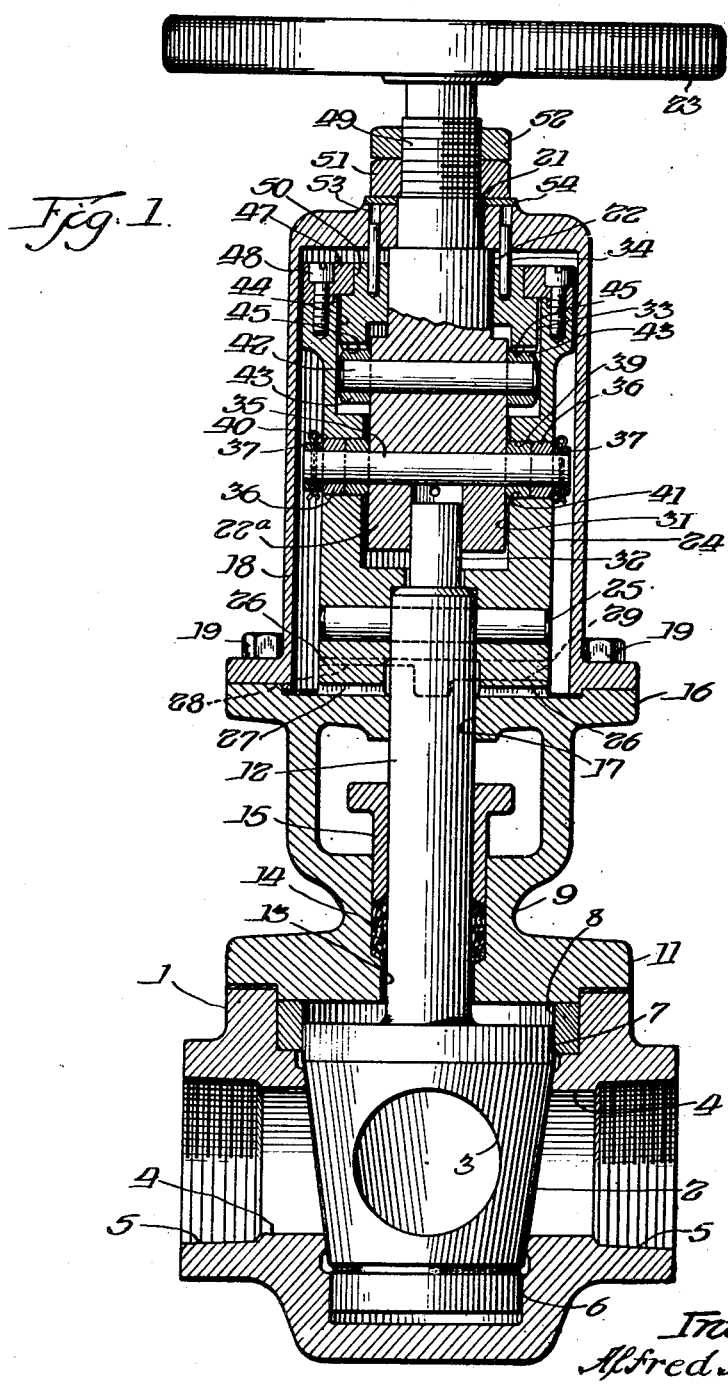

It is obvious that while the accompanying drawings show the application of my invention to a straightway valve, the improvements herein disclosed may be used with three or four-way or angle and elbow types of valves, if desired.

Similar reference characters refer to similar parts throughout the several views.

Referring to Fig. 1 of the drawings, the valve to which my invention is capable to being applied comprises the usual main body or casing 1, the latter being provided with the conventional frusto-conical closure member 2 normally seated therewithin as shown. The closure member is shown in this view in the closed position, that is without its port 3 in registry with the port 4 of the valve body or casing. The latter member is provided with the usual connecting end portions 5, which in this case consist of the conventional tapered pipe threads, the latter threaded passage being in communication with the body port 4. It is understood that the type of end connection employed for the valve body is optional and may consist of either screwed or flanged ends, welded, or provided with brazed or solder ends, if necessary, depending upon the service for which the valve is ultimately to be used and the demands of the trade.

Preferably, although not necessarily, the closure member 2 may be formed with bearings such as the lower and upper cylindrical extended portions 6 and 7 respectively, such bearings engaging the body relatively snugly at the lower portion and also within the annular bearing member 8 at the upper portion thereof. Such combined snugness of a cylindrical fit between the closure member and the casing provides for improved guiding for the closure member during its respective unseating and seating movements within the casing as hereinafter described.

The upper portion of the valve casing 1 is capped by means of the usual bonnet or centerpiece 9 having the flange connection 11 for its attachment to the valve casing by means of conventional bolts (not shown). Here similarly, it will be apparent that if it is desired to employ a screwed connection, a welded joint or other suitable connection, this may be done without departing from the scope of the invention as hereinafter described.

The preferably frusto-conical closure member 2 is provided with a stem or extended portion 12 journaled for rotational and predetermined reciprocable movement within the aperture 13 of the bonnet 9. Above such latter aperture the packing 14 is preferably maintained in a compressed condition within a stuffing box by means of the gland flange 15. Such compression of the packing as referred to is accomplished by means of suitable bolts (not shown) which move the gland 15 longitudinally downward upon the packing in the usual manner.

The upper end portion of the bonnet 9 is provided with the annularly extending flange portion 16 centrally apertured as at 17 to supply an additional bearing for the stem or extended portion 12 of the closure member.

The flanged bonnet cover 18 for containing the novel actuating mechanism is preferably, although not necessarily, attached by means of the stud bolts 19 to the flange 16 of the bonnet 9. The cover 18 is preferably formed with its upper end portion apertured, as indicated at 21, so as to allow for the journaling therein of the extension stem or cam shaft 22 as hereinafter described. The upper end of the cam shaft is provided with the usual handwheel 23, or other suitable lever handle, gears or the like, applied in non-rotatable relation thereto for purpose of actuating the valve as hereinafter described.

Within the lower open end of the cover 18 and journally surrounding an upper portion of the stem 12 projecting through the bonnet aperture 17, the lower cam 24, which is preferably of cylindrical form, is applied as indicated before assembly therewith of the cover 18. The lower cam 24 is held in non-rotatable and axially fixed relation with respect to the stem 12 by means of the transversely extending pin 25, and thus it is significant to observe that the lower cam is rotatably and axially movable with the combined stem and closure member. The pin 25 is preferably made with a drive fit connection between the lower cam 24 and the stem 12. The transverse positioning of the drive pin both with relation to the said stem and the lower cam 24 is arranged so as to permit the underside of the lower cam 24 to employ the stop lugs 26 engaging the transverse surfaces 27, the lugs moving arcuately between the integral stops 28 of the bonnet 9 when the valve closure member 2 is rotated from open to closed position or vice versa and after its subsequent predetermined axial movement to unseat or lift the closure member as hereinafter referred to. Upon the occurrence of the latter condition the lugs 26 pass over or clear the lower extending lugs 29 of the bonnet to permit of the closure member rotation referred to.

As will be apparent, it is not necessary that the rotation limiting means for defining the open and closed position of the valve be applied between the underside of the lower cam 24 and to the upper surface of the bonnet 9 for acceptable performance. The rotation limiting means may be suitably provided as an alternate construction between the closure member and the casing as further described herein.

The generally cylindrical lower cam member 24 is made suitably hollow as indicated at 31 whereby the lower enlarged portion 22a of the extension stem or cam shaft 22 may be received. The reduced upper end portion 32 of the stem 12 is preferably made of a size and shape to be accommodated within the similarly formed lower recess of the extension stem 22.

Thus it will be apparent that the foregoing construction provides for the cam shaft 22 being rotatable, but longitudinally immovable relative both to the lower cam member 24 and to the upper cam member 33, the upper cam member being non-rotatably mounted but telescopically positioned and reciprocably movable in relation to the lower cam member. The vertically extending pins 34 engaging suitable apertures 53 in the upper portion of the bonnet cover 18 inhibit rotational movement of the upper cam 33, and also as later explained serve another novel and useful purpose.

The enlarged end portion 22a of the cam shaft 22 is provided with the axle or shaft 35 extending transversely therethrough, as indicated. The shaft is made preferably of a length sufficient to project beyond the outer peripheral surface of the lower cam 24 and thus permit of the journaling of the rotatable rollers 36 on the shaft which rollers may be positioned in pairs either in side by side relation as shown, or else provided with a single roller. In all instances a lock washer 37 with the split pin 40 may be used to retain the rollers in position for engagement with the unique cam surfaces of the lower cam member 24 now to be described.

Figure 2:
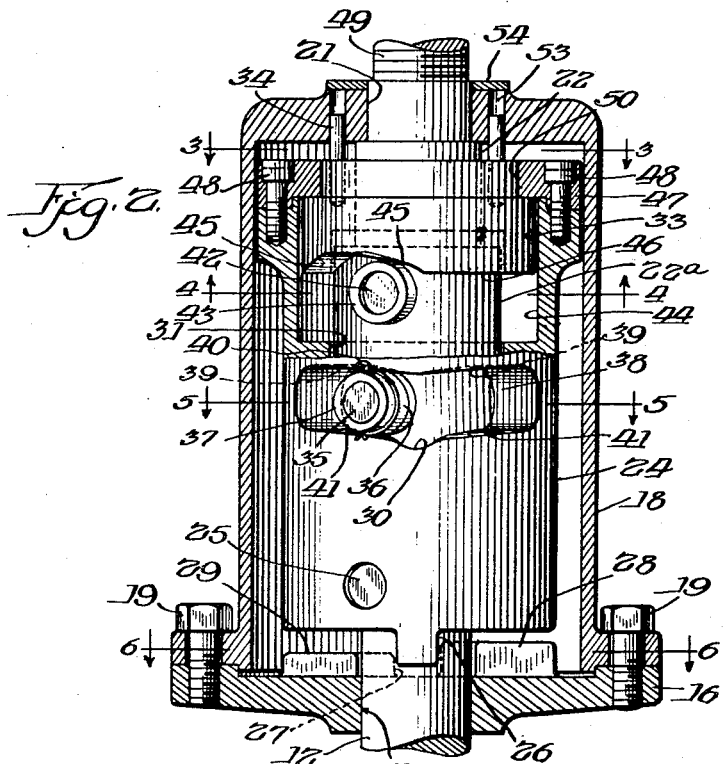
Fig. 2 is a fragmentary section of a preferred form of the combined valve actuating mechanism assembled with one arrangement of rotation limiting means, the view being somewhat magnified for purpose of better illustration of the related parts.
Figure 3:
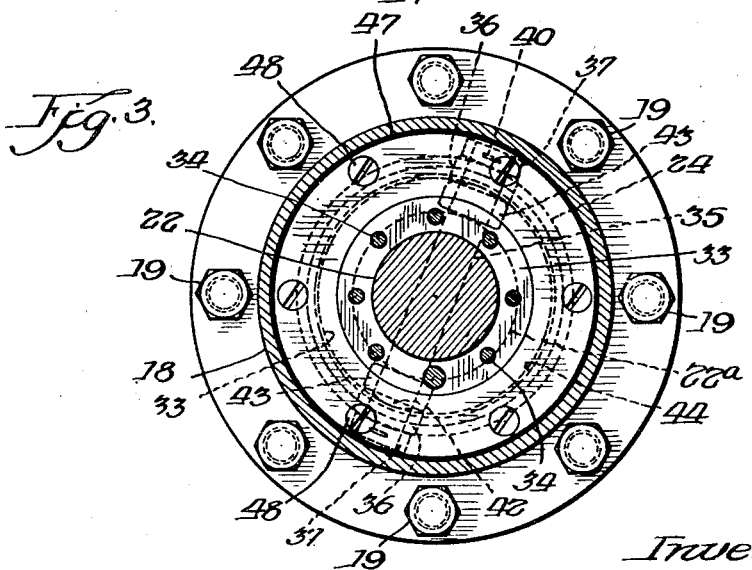
Fig. 3 is a transverse sectional view taken on the line 3—3 of Fig. 2.

As more clearly shown in Fig. 2, the lower cam 24 is provided with the annularly extending modified or flattened V-aperture 38 having the upper and lower cam surfaces 39 and 41 respectively, the latter surfaces being inclined slightly upwardly from the dipped central portion 30. The arcuate length of the apertured portion 38 and of the surfaces 39 and 41 of the lower cam 24 is made sufficiently long to provide for such wear as may occur between the bearing surfaces of the frusto-conical closure member and the casing during normal operation in service.

As to the structural features of the upper cam 33 which in all stages of valve actuation cooperates with the lower cam, suitably spaced-apart from the axle 35 the upper cam pin 42 is positioned which extends through the cam shaft 22 in alignment or in a vertical plane substantially parallel to that of the lower cam pin 35. The pin 42 is similarly provided with the rollers 43 journaled thereon as indicated for engagement with the respective cam surfaces of the upper cam member 33.

However, in the assembly of the upper cam pin and rollers, the roller lock washers described in connection with the lower cam pin may be dispensed with since the length of the pin is made sufficient so as to fit conveniently within the relieved portion 44 of the cylindrical lower cam member 24 thereby retaining the rollers 43 on the pin within the annular chamber thus provided. Obviously a similar roller retaining means as just described may be employed in connection with the lower cam rollers 36 by merely eliminating the annular chamber between the lower cam 24 and the inside periphery of the bonnet cover 18.

The upper cam member 33 on its lower annular edge portion is shaped so as to provide for a novel cam surface arrangement as indicated in Figs. 2 and 7, the cam surfaces 45 and 46 allowing for the actuating contact by the journaled rollers 43 to effect the desired longitudinal movement of the cam shaft 22 in unseating and seating the closure member after predetermined rotation. The cutaway portion in Fig. 2 shows the arrangement of the cam members and related parts more clearly.

The non-rotatable upper cam 33 is thus located in predetermined axial position by means of the oppositely disposed rollers 43 bearing against the lower cam surfaces 45 or 46, and is further retained by the ring member 47 attached by the cap screws 48 to the upper annular portion of the lower cam 24. As indicated at 49 in Fig. 1, the cam shaft 22 is provided with the threaded shank having the threaded lower nut 51 and an upper locknut 52 to hold the cam shaft against substantial longitudinal movement. Above the free ends of the drive pins 34 holding the upper cam against rotation, the through holes 53 are preferably capped by means of the annular washer 54 thus permitting the pins 34 to be moved longitudinally upon lifting of the plug during the course of operation. Obviously the chambers 53 may be suitably cored rather than extending therethrough as drilled holes as shown. Also the washer may be dispensed with or else made transparent so that visual evidence of the reciprocal movement of the pins 34 may be made when desired in order to determine whether or not the closure member is actually being seated or unseated after installation in service. The latter advantage will be better understood in connection with the operation of the actuating mechanism hereinafter described.

Referring now to the closure member bearing modification shown in Fig. 8, this has a special significance in many instances. In some of the larger sizes of these valves having a reciprocably movable closure member it may be desirable to employ a form of construction which is termed a needle bearing. The latter arrangement is provided by the positioning of a number of vertically extending small pin-shaped bearings 55 snugly fitting within an annular recess between the casing and the member 8 as shown, the latter being made of smaller diameter in order to accommodate these vertically extending pins. Similarly, the pins 55 may be retained within retaining members 56 and 57 of substantially L-shaped cross-section for the like purpose of reducing the frictional resistance between the plug and the casing or body when the plug is being rotated and lifted during the course of normal valve operation.

In a further modification of the structure as shown more clearly in Figs. 9 and 10, it will be apparent that the limiting means for inhibiting rotation of the closure member from open to closed position and vice versa need not necessarily be similar to that arrangement described in connection with Fig. 1. Instead, the valve casing at its lowermost portion and below the closure member 2 may be provided with suitable stops 58 between which stops the lug 59 on the closure member may move to limit the closure member to 90 degrees of arcuate travel in opening or closing the valve. Thus the actuating mechanism may be made without the rotation limiting means being directly associated therewith.

In proceeding with a description of the operation of the combined valve and actuating mechanism, assume the valve closure member 2 to be placed in the closed and seated position as shown in Fig. 1. The operation of the respective cooperating cams will perhaps be best understood by now referring to Fig. 2. In the closed position of the valve as referred to, the respective rollers 36 and 43 of the cam members will occupy the inclined surfaces 41 and 45 respectively of the lower and upper cams 24 and 33 as illustrated in the latter mentioned figure. As is true in the conventional valve, the handwheel 23 when looking down upon it will be rotated in a counter-clockwise direction to open the valve. Immediately upon such movement being initiated the rollers 43 will move to the right upon the inclined cam surface 45 on the upper cam and at the same time the rollers 36 will move to the right upon the inclined surface 41 on the lower cam 24. It is apparent that such rotational travel of both of these rollers as just described will occur together and simultaneously because their respective shafts 42 and 35 are fixedly positioned and parallel in a vertical plane in their transverse journaling within the cam shaft or divided stem portion 22. The movement of the rollers 43 upon the inclined surface 45 of the non-rotatable but longitudinally movable upper cam member 22 immediately causes the upper cam which is pinned against rotation to the bonnet cover 18 by the pins 34 to be lifted or moved upwardly. The lower cam 24 is also simultaneously moved upwardly with the upper cam, the engaging shoulder therebetween formed by the retaining ring 47 around the aperture 50 serving thus to carry upwardly the said retaining ring, the upper and lower cams, the cam shaft or extension stem 22, the closure member 2, altogether as a unit. In the latter connection, attention is directed to the fact that the lower cam 24 is firmly attached to the stem 12 of the closure member 2 by means of the transversely extending pin 25.

The movement of the rollers 36 to the right along the surface 41 of the lower cam 24 will continue with the rotation of the handwheel in the direction above mentioned until the upper rollers 43 engaging the lower surface 45 of the upper cam 33 reach the horizontally extending annular cam surface 46. At this juncture it will be noted that the rollers 36 move into the lowermost valley or modified V portion 30 of the lower cam 24. By reason of such latter positioning of the rollers 36 within the lowermost cam surface 30, the lower cam member 24 ceases to be lifted, the rollers 36 being held against ascent of the inclined cam surface 41 in view of the rollers 43 moving along the horizontal cam surface 46. Such locking effect against continued longitudinal movement of the lower cam by the rollers of the upper cam now allows for the lower cam to be rotated with the cam shaft and closure member. With the continued rotational movement of the closure member from closed to open position, movement of the rollers 43 along the horizontal cam surface 46 continues until the stop lug 26 of the cam 24 contacts the abutting surface 27 of the lug 28 on the upper portion of the bonnet 9. In the modified stop arrangement of Figs. 9 and 10, this obviously would occur when the closure member stop 59 abuts against the lug 58 of the casing. At this stage (the end of rotation for the closure member in the open position) the rollers 43 will have reached the end of the horizontal cam surface 46 and commenced to move down the perimetrically opposite upwardly inclined surface 45. The immediate result of the latter mentioned movement of the rollers 43 is to release these rollers from the locking effect of the lowermost cam surface 30 and to permit the said rollers to commence the ascent of the perimetrically opposite inclined cam surfaces 41. As the rollers 36 ascend the latter mentioned inclined cam surface 46 the lower cam 24 and the closure member are forced longitudinally downward and thereby reseat the valve closure member within the casing 1 after its substantially 90 degree opening movement. The handwheel itself in allowing for the unseating and reseating of the closure member in addition to the 90 degree movement referred to has rotated through an arc of less than 180 degrees, but this will vary with the angularity of the cam surfaces employed and the wear occurring in service. The reverse movement of the valve closure member in returning to its closed position will provide for the same cycle of cam cooperation as above described in opening the valve.

It will be apparent from the foregoing description of operation that a simple, sturdy and economical method of actuating a valve of this character has been devised. Tests have indicated its superior performance over previous types. While a specific arrangement of rollers and cams as indicated has been shown and described, it is obvious that numerous forms of cam surfaces, operating in a similar manner and without the use of rollers, may be applied within the scope of this disclosure. Nor would it be necessary with the employment of certain types of operators or service conditions to enclose the valve actuating mechanism as described, since under certain conditions there would be no sacrifice of the durability or performance referred to. Thus my invention is capable of using related modifications which will readily occur to those skilled in the art. The particular shape or detailed positioning of the various elements involved is not essential to the invention and variations other than those mentioned could be used without departing from its spirit.

It is the intent therefore to be limited only to the extent defined by the scope of the appended claims.

I claim:

1. An operating mechanism for a valve of the rotary type having a casing, a frusto-conical closure member and an actuating stem therefor, the stem having an extension member longitudinally movable relative thereto, upper and lower cam members mounted upon the said stem and extension member, the said extension member having transverse axle portions cooperating therewith to ride upon inclined surfaces of the said cam members, the lower cam member being non-rotatable and being held axially fixed relative to the stem, supporting means for the said extension member adjacent the upper portion of the stem, the upper cam being non-rotatably mounted and reciprocably movable relative to the lower cam member, non-rotatable, axially movable means cooperating with the said extension member supporting means to inhibit rotational movement of the said upper cam member.

2. An operating mechanism for a valve of the rotary type having a casing, a frusto-conical closure member and an actuating stem therefor, the stem having an extension member longitudinally movable relative thereto, upper and lower cam members mounted upon the said stem and extension member, the lower cam member being formed to receive the extension member, the said extension member having means to move upon inclined surface portions of the said cam members, the lower cam member being non-rotatable and axially fixed relative to the stem, the upper cam being non-rotatably mounted and reciprocably movable relative to the lower cam member, means to inhibit rotational movement of the said upper cam member, the said latter means including a support for the said extension member cooperating with the said stem to journal the latter member.

3. An operating mechanism for a valve of the rotary type having a casing, a frusto-conical closure member and an actuating stem therefor, the stem having a cam shaft longitudinally movable relative thereto, upper and lower cam members cooperating with the said stem and cam shaft to provide for predetermined rotative and axial movement of the closure member, the cam shaft having extension means engageable with the said cam members, the lower cam member being non-rotatable relative to the said stem, the upper cam being reciprocably movable relative to the lower cam member, means to inhibit rotational movement of the said upper cam member, the said lower cam member having annular surfaces for engagement by a portion of the said cam shaft, the surfaces being inclined upwardly in opposite directions from a lower central portion.

4. An operating mechanism for a valve of the rotary type having a casing, a frusto-conical closure member and an actuating stem therefor, the stem having an extension member longitudinally movable relative thereto, upper and lower cam members mounted in telescoped relation upon the said stem and extension member, the said extension member having transversely projecting means slidable upon inclined surfaces of the said cam members, the lower cam member being non-rotatable relative to the stem, the upper cam being non-rotatably mounted and being reciprocably movable relative to the lower cam member, the cam surfaces of the said upper cam providing for longitudinal movement of the said extension member after predetermined rotation of the said stem.

5. An actuating mechanism for a valve of the rotary type having a casing, a combined rotatable and reciprocably movable closure member and an actuating stem therefor, the stem having an extension member longitudinally movable relative thereto, the extension member having actuating means cooperating therewith, upper and lower cam members mounted upon the said stem and extension member, means for supporting the said extension member non-rotatably while permitting limited axial movement of the extension member, the said extension member having radially extending means arranged to move slidably upon inclined surfaces of the said cam members, the lower cam member being non-rotatable and axially immovable relative to the stem and having stop means for limiting rotation of the closure member, the upper cam being non-rotatably mounted and reciprocably movable relative to the lower cam member, means cooperating with the stem for limiting rotational movement of the closure member, the said extension member having threaded means to limit the axial movement of the said extension member.

6. A combined valve rotating and lifting mechanism for a valve of the rotary type having a casing, a rotatable and reciprocably movable closure member and an actuating stem therefor, the stem having a cam-shaft mounted thereon and longitudinally movable relative thereto, upper and lower cam members mounted upon the said stem and cam shaft, the said cam-shaft having superposed axle portions movable upon respective inclined surfaces of the said cam members, the lower cam member being non-rotatable and axially fixed relative to the stem, the upper cam being non-rotatably mounted and reciprocably movable relative to the lower cam member, one of the cam surfaces being of substantially V-form, the other having a horizontally extending surface portion, whereby the said cam shaft cooperates with one of the cam members to hold the other cam member against longitudinal movement upon predetermined rotation of the said cam shaft.

7. A valve actuating and lifting mechanism for a valve of the rotary type having a casing, a rotatable reciprocably movable closure member and an actuating stem therefor, the stem having an extension member at its upper portion longitudinally movable relative thereto, upper and lower cam members mounted upon the said stem and extension member, the said extension member having radially extending portions arranged to move upon inclined surfaces of the said cam members, the lower cam member being non-rotatable and axially fixed relative to the stem and having stop means for limiting rotation of the closure member, the upper cam being non-rotatably mounted and reciprocably movable relative to the lower cam member, whereby initial movement of the said radially extending portions upon the inclined surfaces of the upper cam effects the upward movement of both cam members and the said extension member, subsequent lift of the lower cam being restricted whereupon the latter member is rotatable with the extension member.

8. An operating mechanism for a valve of the rotary type having a casing, a rotatable reciprocably movable closure member and an actuating stem therefor, the stem having an extension member longitudinally movable relative thereto, upper and lower cam members of substantially cylindrical form mounted in telescoped relation upon the said stem and extension member, the said extension member being supported upon oppositely disposed inclined surfaces of the said cam members, the lower cam member being non-rotatable and axially fixed relative to the stem and having stop lugs for limiting rotation of the closure member, the upper cam being non-rotatably mounted and reciprocably movable relative to the lower cam member, vertical pins engaging suitable apertures to inhibit rotational movement of the said upper cam member, the said extension member having radially extending shafts in a plurality of planes for engagement of the inclined surfaces of the said cam members.

ALFRED MUELLER.